United States Patent [19]

Horsch

[11] Patent Number: 4,646,895

[45] Date of Patent: Mar. 3, 1987

[54] HYDRAULIC CONTROL FOR A TRANSMISSION WITH HIGH-LOW POWERSHIFT AND MASTERCLUTCH

[75] Inventor: Joachim Horsch, Lombard, Ill.

[73] Assignee: J. I. Case Company, Racine, Wis.

[21] Appl. No.: 690,561

[22] Filed: Jan. 11, 1985

[51] Int. Cl.[4] ............................................. F16D 25/11
[52] U.S. Cl. .................................. 192/87.13; 192/3.58; 192/87.18
[58] Field of Search ................. 192/87.1, 87.13, 87.14, 192/87.18, 87.19, 3.58

[56] References Cited

U.S. PATENT DOCUMENTS

| | | | |
|---|---|---|---|
| 2,946,241 | 7/1960 | Snyder | 192/87.18 X |
| 3,780,762 | 12/1973 | Matthews et al. | 192/87.19 X |
| 3,831,725 | 8/1974 | Schott | 192/87.13 |
| 3,918,488 | 11/1975 | Minami | 192/87.18 X |
| 4,219,109 | 8/1980 | Ushijimi et al. | 192/87.13 |
| 4,380,278 | 4/1983 | Lasken | 192/3.58 |
| 4,498,356 | 2/1985 | Vater et al. | 74/745 |

Primary Examiner—Rodney H. Bonck
Assistant Examiner—Richard M. Lorence
Attorney, Agent, or Firm—Cullen, Sloman, Cantor, Grauer, Scott & Rutherford

[57] ABSTRACT

The control system is provided for the High-Low clutches of a High-Low powershift transmission. The control system functions in a manner to prevent simultaneous engagement of the separate clutches. The control system also provides a phased disengagement of the outgoing clutch to provide for smoother shifting when changing gear ratios.

1 Claim, 2 Drawing Figures

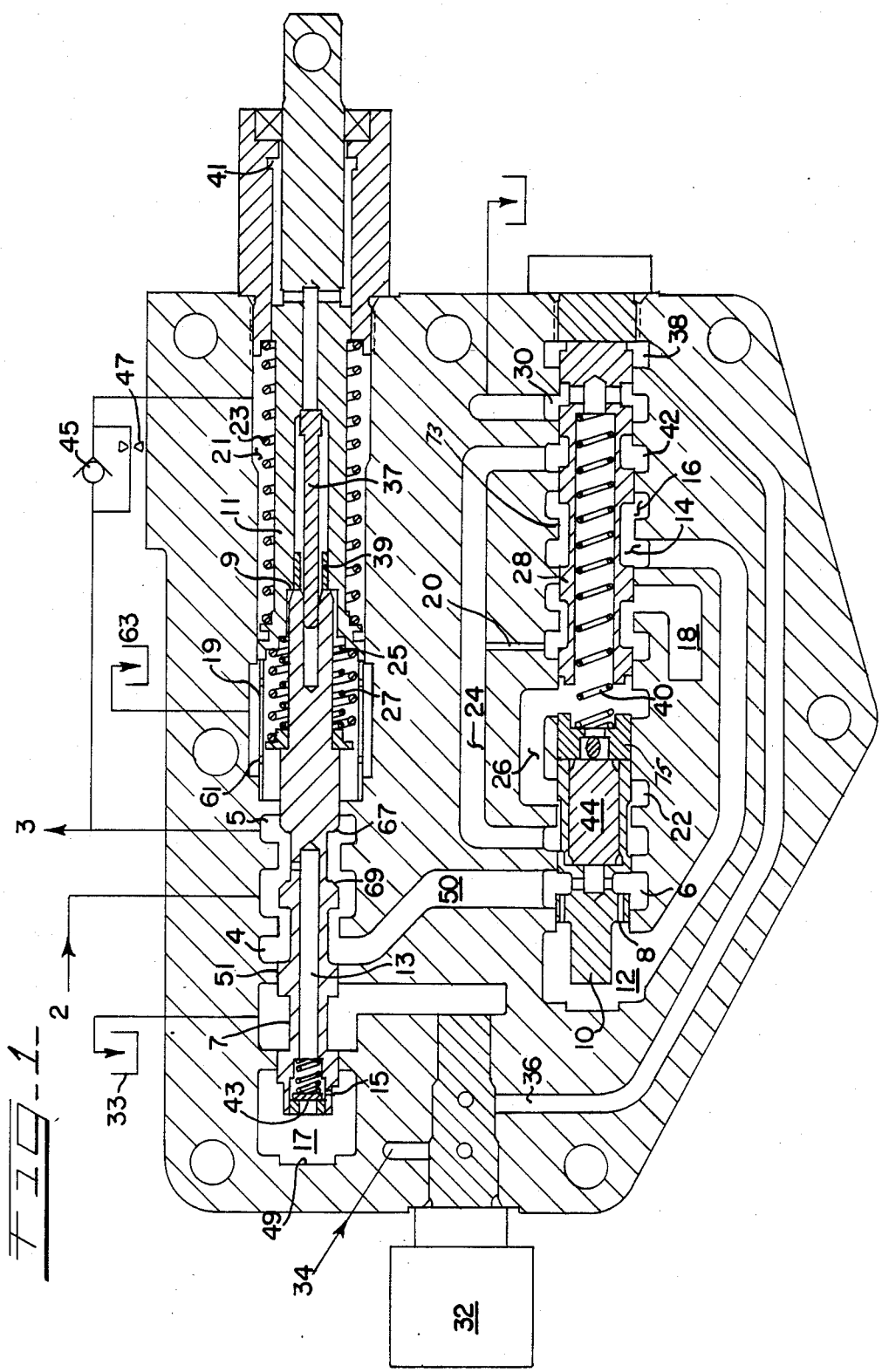

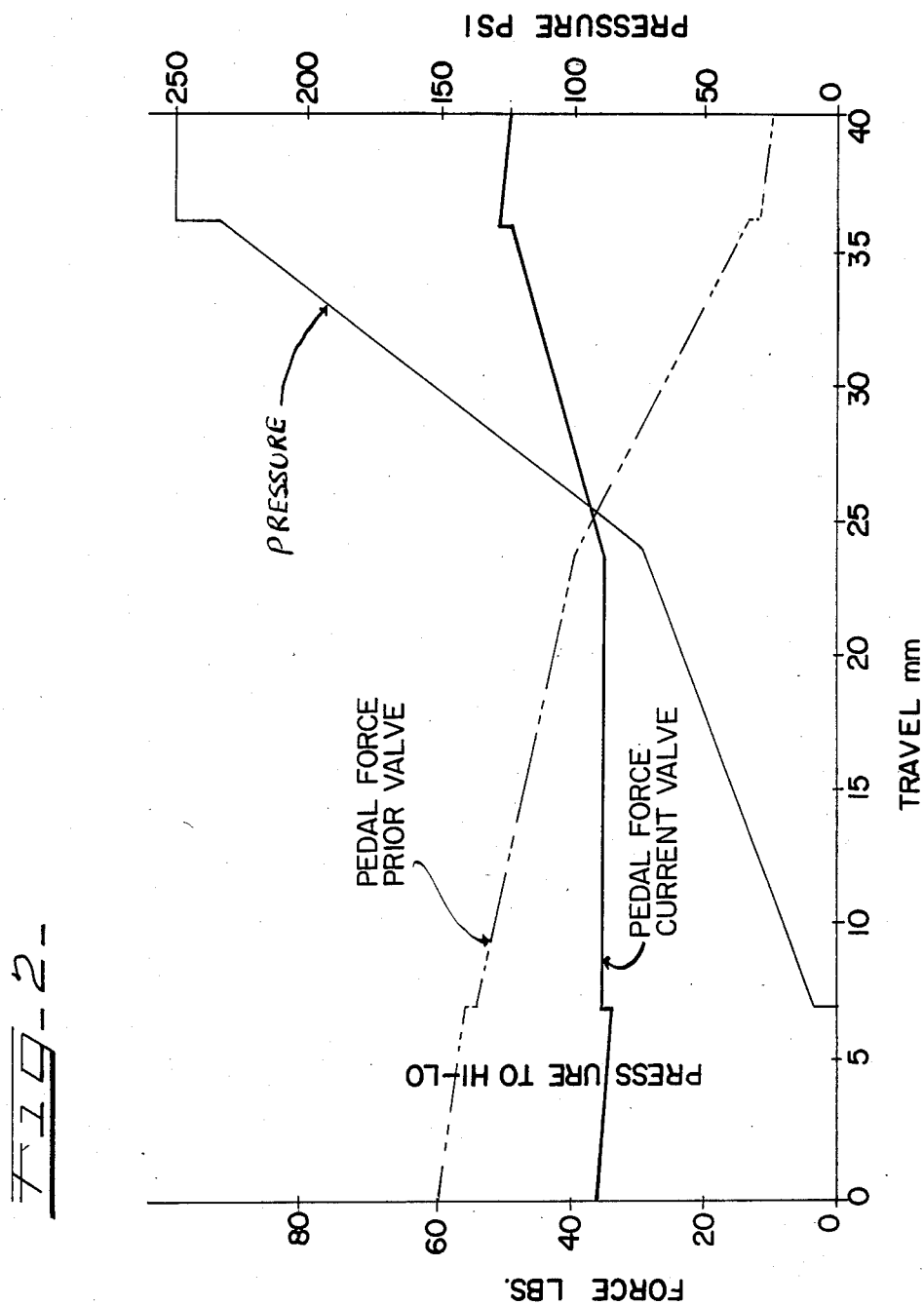

HYDRAULIC CONTROL FOR A TRANSMISSION WITH HIGH-LOW POWERSHIFT AND MASTERCLUTCH

BACKGROUND OF THE INVENTION

This invention relates to rotary power transmission systems and more particularly to power transmission systems utilizing a plurality of clutches for changing the gear ratio of a transmission. An example of such a transmission is described and explained in co-assigned U.S. patent application Ser. No. 379,549, to Vater et al, filed May 18, 1982, now U.S. Pat. No. 4,498,356, entitled "Motor Vehicle Transmission". The present invention relates to a control system for a motor clutch transmission that prevents simultaneous engagement of the HIGH and LOW gear ratio clutches and also provides for a phased disengagement of the outgoing clutch to provide for smoother shifting.

DISCLOSURE STATEMENT

Transmissions that shift gears by engaging one clutch while simultaneously disengaging another clutch are known. However, many of such transmissions, particularly those using multiple plate clutches, have disadvantages of rough shifts that jolt vehicle during the shift, particularly if the shift is made under load, such as for example, in a heavily loaded tractor. In order to avoid such jolts, it has been proposed for the two clutches to be provided a certain amount of clutch overlap whereby one or both clutches are forced slightly to slip for an instant, and wherein the clutch which carries the load prior to the shift is not disengaged until the newly engaged clutch has engaged sufficiently to transmit a substantial amount of torque.

Although such a clutch overlap control system causing temporary clutch slippage does significantly smooth out the shifting characteristics of the vehicle, there is a possibility that in the event of a failure of a component of the control system, one of the clutches could fail to disengage after a shift. This would result in a situation wherein one or both of the engaged clutches could continue to slip with severe damage to one or more of the clutches, or to other components of the engine or transmission.

A clutch control system which overcomes many of the disadvantages of prior clutch control systems is co-asigned U.S. Pat. No. 4,380,278, Lasken, entitled "Multiple Clutch Control System Employing Clutch Status Monitor". A preferred embodiment of Laken provides a system that employs a pair of pressure switches in a logic control circuit for sensing hydraulic pressures in the hydraulic control systems of a pair of hydraulically operated clutches. The logic system is responsive to the signal provided by the pressure switches and by simultaneous deenergization of both clutches, the logic system serves to disengage the newly engaged clutch, in the event that the previously engaged clutch has failed to disengage within a predetermined amount of time after a shift has occurred.

It is the desire to develop a control system for hydraulically operated clutches which have similar operating characteristics to that as described in the Lasken system without such extensive reliance on electronic controls, such as those utilized in the logic circuit of Lasken's control system.

SUMMARY OF THE INVENTION

The present invention control system for the fluid activated clutches provide a shift sequence wherein the incoming clutch is first disconnected from the drain, the outgoing clutch is then disconected from pressure, the incoming clutch is then connected with the pressure, finally the outgoing clutch is connected to the drain. The above sequence of events is accomplished with the use of a selector spool valve in combination with a drainage valve. Activation of the selector valve may be through various means such as a mechanical linkage or by fluid activation. In a preferred embodiment the selector valve is activated by hydraulic fluid controlled by a solenoid valve. The solenoid valve is controlled by the vehicle operator.

The drainage valve in cooperation with the selector valve maintains the pressure in the outgoing clutch until the pressure within the incoming clutch reaches a predetermined value, providing the torque overlap characteristic of the control system.

It is an object of the present invention to provide a control system for fluid activated clutch wherein the selective spool is phased such that in no position of the selective spool can the two clutches be fully engaged simultaneously. It is an object of the present invention to provide a control system for two fluid activated clutches wherein the selective spool may be activated mechanically or through a solenoid valve. It is an object of the present invention to utilize the normal drain port or ports to affect an overlap shift by pressurizing the port or ports through a drainage valve during the period of clutch fill. It is a desire of the present invention to provide a drainage valve which comprises a spool sensing the flow to the infilling clutch. In a preferred embodiment the drainage valve spool is actuated by the differential areas acting on each end of the spool and is not sensitive to the regulated pressure of the system as a spring bias valve would be. It is also a desire of the present invention to provide a multiple clutch control system which eliminates the use of extensive electronic monitors.

Although the present invention will be mainly described in the environment for a set of clutches both fluidly activated it is apparent to those skilled in the art that the present invention can be utilized wherein one clutch is activated by fluid pressure and a second clutch is relieved by fluid pressure.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 1 is a top sectional view of the control system of the present invention;

FIG. 2 is a graph illustrating the relationship between pedal force and master clutch pressure.

DETAILED DESCRIPTION OF THE DRAWINGS

High-Low Powershift Control

In the position shown, pressurized fluid (hydraulic oil) is directed from source 2 in through port 4, through port 6 (via port 50), through orifice 8 in spool (or drainage valve) 10, through port 12, through port 14 to the High clutch piston (not shown) connected by port 16. The Low clutch piston (not shown) connected to passage 18 is drained through passages 20 and 24, through port 22, through passage 26, through the holes in spool 28, to drain port 30. When a shift is made by actuating the solenoid 32, pressure fluid is directed from port 34 through passage 36 (36 was connected to drain by solenoid 32 prior to shift) to port 38, forcing the spool 28 (which is slideably mounted within the bore 73) toward the left against the force of spring 40. Spring 40 at its left end is held by divider 75 which divides bore 73 into separate but communicating chambers. The movement of (selector) spool 28 will connect the Low clutch passage port 18 to port 14 and the High clutch port to drainage port 42. As oil flows from 2 through orifice 8 a pressure drop occurs in port 12 causing spool 10 to shift leftward due to the force caused by reaction pin 44. Now drainage port 42 is cut off from drain and connected to source 2, (via passage 50) thus the High clutch port 16 is still pressurized while the Low clutch port 18 is being filled. As soon as the flow to the Low clutch stops, the pressure rises in port 12, shifting the spool 10 rightward, connecting the High clutch to drain and of course simultaneously the Low clutch is now pressurized.

Shifting from Low to High the solenoid 32 connects the port 36 to drain causing the spool 28 to move rightward and triggering the same sequence of events described above.

Master Clutch Control

In the position shown the master clutch 3 is pressurized from 2 to port 5. The spool 7 is held against surface 9 of spool 11 by pressure directed through internal passage 13 in spool 7 through damping orifice 15 in spool 7 to chamber 17. The spool 11 is held against the stop 19 by pressure in the annular spring cavity 21, in addition the force of spring 23.

As spool 11 is pulled rightward by actuating the clutch pedal, the spool 7 will follow the rightward motion until the metering slots 69 and 67 are positioned between 2 on one side and drain 63 on the other side causing the pressure in port 5 to drop until a force equilibrium is established between the pressure force in port 17 and the force of springs 25 and 27. (Stop 19 has holes 61 to allow the chambers surrounding springs 27 and 25 to communicate with drain 63). At this point of motion the contact at surface 9 is eliminated. Further rightward motion of spool 11 will decrease the force of spring 25 and 27 reducing the clutch pressure further. At approximately mid-point of the rightward movement the spring 27 reaches its free length and the force of 25 only is acting on spool 11. Further motion of spool 11 will continue to decrease the clutch pressure but at a lower rate. Spool members 7 and 11 have a lost motion type connecti,on. Eventually the headed pin 37 (pressed into spool 7) will contact the bushing 39, and further rightward movement of spool 11 will also pull spool 7 rightward. This will drop the pressure to the master clutch to zero and also will cut off pressure from port 4 and connect it (4) to drain 33. Thus, the pressure to the powershift (sometimes referred to auxiliary) clutches High or Low is dropped to zero. The spool 11 will finally contact the surface 41 at the extreme right position.

When the clutch pedal is released the spool 11 will move leftward urged by the force of spring 23. If the leftward movement is sudden, the check valve 43 opens allowing oil to flow out of cavity 17 at a high rate rather than being restricted by orifice 15. (This orifice 15 is required for damping purposes in the metering position.) Thus, spool 11 can move rapidly to the metering position allowing for a good response.

When the clutch pedal is actuated rapidly pulling spool 11 rapidly rightward, oil is displaced from cavity 21 through check valve 45 at a rapid rate. Thus, the clutch can be disengaged rapidly. When the clutch pedal is released rapidly oil flow is restricted through orifice 47 into cavity 21. Thus, the clutch pedal will return at a slow rate providing for a gradual engagement of the clutch. The combination of check valve 45 and fluid resistor 47 mounted in parallel provides unidirectional fluid resistance in the line connecting the clutch outlet and the first chamber (spring chamber 21).

When the tractor is shut down the fluid pressure from source 2 is zero. That allows the spool 7 to move leftward against surface 49 urged by springs 25 and 27. On start up the pressure cannot build up in chamber 17 since it is connected to drain 33 in this position. Thus, pressure cannot get to any of the clutches. The clutch pedal will have to be depressed to mechanically pull the spool 7 rightward to disconnect port 17 from drain. Then after the pedal is released pressure can build up in port 17 and thus in the clutches. Therefore the engine can be started in any gear, but the tractor will not move until the clutch pedal is depressed and released.

The above arrangement of the spool and spring that allows for a clutch control spool without a reduced area reaction pin as utilized on the clutch control valve of the previous tractors. Yet the present inventive clutch control valve provides for low pedal efforts within the limited pedal travel. This is done by using the clutch pressure to "help" the operator in actuating the pedal. (A large reaction area on the spool causes larger forces on the spool making it less sensitive to frictional forces. Thus, a more precise clutch control is effected.) The clutch pressure acting on the actuating stem or spool 11 allows a reduced force spring 23. If the clutch pressure were not used, the force of spring 23 would have to be large enough to hold spool 11 to stop 19 against the source 2 pressure times the area of spool 7. As the spool 11 is pulled rightward, the spring force would continue to increase causing a high pedal effort. With the use of the clutch pressure, the spring force, plus the pressure force equals the force on spool 7. Now, as the spool 11 is moved rightward, the pressure force drops as the spring force rises to provide a much reduced net pedal effort. FIG. 2 illustrates the pedal force versus travel force relationship of a prior master clutch control valve and the master clutch control valve of the present invention.

The clutch control valve provides for a high initial pedal effort with a low pedal effort in the "inching" control range. This will eliminate the tendency for the clutch to be partially engaged when the operator rests his foot on the clutch pedal. It will also tend to be less sensitive to binding linkage due to dirt and rust which may not allow the pedal to return to the fully engaged position. Of course clutch failure can be the result if the clutch is not allowed to fully engage.

Again, using the clutch pressure to act on the actuating stem 11 provides a high force when the clutch pressure is high and reduced force when it is low.

The arrangement of check valve 45 and fluid resistor 47 provides for a gradual clutch engagement when the pedal is suddenly released by restricting the oil flow to the actuating spool 11 in one direction only. The arrangement of landing 51 or spool 7 drops the High-Low clutch pressure by preventing flow through passage 50 when the clutch pedal is completely depressed.

While a few of the embodiments of the present invention have been explained, it will be readily apparent to those skilled in the art of the various modifications which can be made to the present invention without departing from the spirit and scope of this application as it is encompassed by the following claim.

What is claimed is:

1. A valve system for controlling two fluid activated clutches comprising:

- a valve body having a bore and a divider for dividing said bore into first and second chambers;
- a fluid inlet intersecting said bore for permitting pressurized fluid to enter said bore;
- a fluid outlet intersecting said bore for permitting pressurized fluid to exit said bore;
- first and second clutch lines intersecting said bore;
- a spring biased selector valve mounted within said first chamber at one end of said bore having a first position allowing fluid communication between said fluid inlet and said first clutch line and fluid communication between said fluid outlet and said second clutch line, said selector valve having a second position preventing fluid communication between said second clutch line and said fluid outlet, said selector valve having a third position preventing fluid communication between said first clutch line and said fluid inlet, said selector valve having a fourth position allowing fluid communication between said fluid inlet and said second clutch line, and said selector valve having a fifth position allowing fluid communication between said second clutch line and said fluid inlet and between said first clutch line and said fluid outlet;
- said selector valve including an internal passage coaxial with said bore and open at one end thereof, a portion of said selector valve forming a piston end within said bore, and a solenoid valve for applying fluid pressure against said selector valve portion for shifting said selector valve;
- a spring biased drainage valve mounted at the opposite end of said bore within said second chamber for preventing fluid communication through said fluid outlet when said selector valve is in said fourth position until the fluid pressure within said second clutch line reaches a predetermined level, said drainage valve being movable from a first position allowing fluid communication through said fluid outlet to a second position preventing fluid communication through said fluid outlet, and said drainage valve being movable between said first and second positions by fluid flow through said fluid inlet; and
- said selector and drainage valves coaxially mounted within said bore and said drainage valve comprising a two-piece member including a sleeve valve slidably mounted over a reaction pin and said sleeve valve contacting said bore divider.

* * * * *